(12) United States Patent
Kitamura et al.

(10) Patent No.: US 7,395,054 B2
(45) Date of Patent: Jul. 1, 2008

(54) CONTENT DISTRIBUTING METHOD (75) Inventors: Takuya Kitamura, Kawasaki (JP);
Yasufumi Honda, Kawasaki (JP);
Hiroshi Ikeda, Kawasaki (JP);
Masaharu Yoshiyama, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 487 days.

(21) Appl. No.: 11/043,080

(22) Filed: Jan. 27, 2005

(65) Prior Publication Data
US 2005/0173513 A1 Aug. 11, 2005

Related U.S. Application Data (63) Continuation of application No. PCT/JP03/00494, filed on Jan. 21, 2003.

(51) Int. Cl.
*H04M 3/00* (2006.01)
(52) U.S. Cl. ............... 455/418; 455/420; 455/41.2; 370/328; 370/315; 709/208
(58) Field of Classification Search .......... 455/418, 455/420, 41.2; 370/328, 315; 709/208
See application file for complete search history.

(56) References Cited

U.S. PATENT DOCUMENTS

| 2001/0021638 A1 | 9/2001 | Spratt et al. | |
|---|---|---|---|
| 2002/0025777 A1* | 2/2002 | Kawamata et al. | 455/3.05 |
| 2002/0085511 A1* | 7/2002 | Koponen et al. | 370/315 |
| 2003/0124979 A1* | 7/2003 | Tanada et al. | 455/41 |
| 2003/0135748 A1* | 7/2003 | Yamada et al. | 713/193 |

FOREIGN PATENT DOCUMENTS

| JP | 2002-189663 | 7/2002 |
|---|---|---|
| JP | 2002-259584 | 9/2002 |
| JP | 2002-298007 | 10/2002 |

OTHER PUBLICATIONS

Hidekazu Umeda "The Possibility of Wireless P2P" Event report, P2P Conference in Japan, 2002 (http://www.watch.impress.co.jp/internet/www/article/2002/0412/p2pc3.htm).
International Search Report in International application No. PCT/JP03/00494, Dated May 27, 2003.
Notice of Reason for Rejection issued on Mar. 11, 2008 in the corresponding Japanese Patent Application No. 2004-567131 (3 pages) (5 pages of English translation).

* cited by examiner

*Primary Examiner*—Danh Le
(74) *Attorney, Agent, or Firm*—Staas & Halsey LLP (57) ABSTRACT

A technology for distributing a content to wireless portable terminals through P2P by using a short-haul radio scheme. A wireless terminal detects another wireless terminal capable of communicating with the first wireless terminal, receives a content, receives control information on the content, and carries out control according to the control information. The present invention wherein communication reflects the intention of the content providing side since wireless terminals perform communication according to the control information, a content distributing method, a wireless terminal, a content distribution program, and a content distribution system are disclosed.

24 Claims, 8 Drawing Sheets

DATE INFORMATION | POSITIONAL INFORMATION | | | | UPPER LIMIT COPY NUMBER | CURRENT NUMBER OF COPYING TIMES

| DATE INFORMATION | LONGITUDE START POINT INFORMATION | LATITUDE START POINT INFORMATION | LONGITUDE END POINT INFORMATION | LATITUDE END POINT INFORMATION | UPPER LIMIT COPY NUMBER | CURRENT NUMBER OF COPYING TIMES |
|---|---|---|---|---|---|---|
| 20020831 | 138.4 | 67.8 | 139.1 | 68.2 | 100 | 28 |

FIG. 3B

| UNIQUE IDENTIFIER | GENRE IDENTIFIER |
|---|---|
| 9f34abe975124567 | 83fe |

| | |
|---|---|
| 9f34abe975124567 | 5 |
| fe450a12b75d889 | 4 |
| 4fff95842526296682 | 5 |
| c6a7645301993bcd | 5 |

EVALUATION RESULT

UNIQUE IDENTIFIER OF SLAVE CONTENTS VIEWED AND LISTENED TO TO END

FIG. 8

PRIOR ART

CONTENT DISTRIBUTING METHOD

CROSS REFERENCE TO RELATED APPLICATIONS

This is a continuing application, filed under 35 U.S.C. §111(a), of International Application PCT/JP03/00494, filed Jan. 21, 2003.

BACKGROUND OF THE INVENTION

The present invention relates to a technology for distributing content to wireless portable terminals by using a short-haul radio scheme or the like such as Blue-tooth (registered trademark) or IEEE 802.11/802.11b.

With speeding-up of a radio technology, it is now possible to transfer content such as music or videos to a wireless terminal such as a portable telephone within a relatively short time. In fact, services for distributing such content to a wireless terminal have been rendered (Patent Documents 1 to 4).

This has been accompanied by use of the wireless terminal such as a portable telephone as an advertisement medium. At present, the advertisement using the portable telephone includes "Mobile Advertisement". The Mobile Advertisement is designed to distribute characters/images as ads by electronic mail to the portable telephone connectable to Internet.

Figure 8:
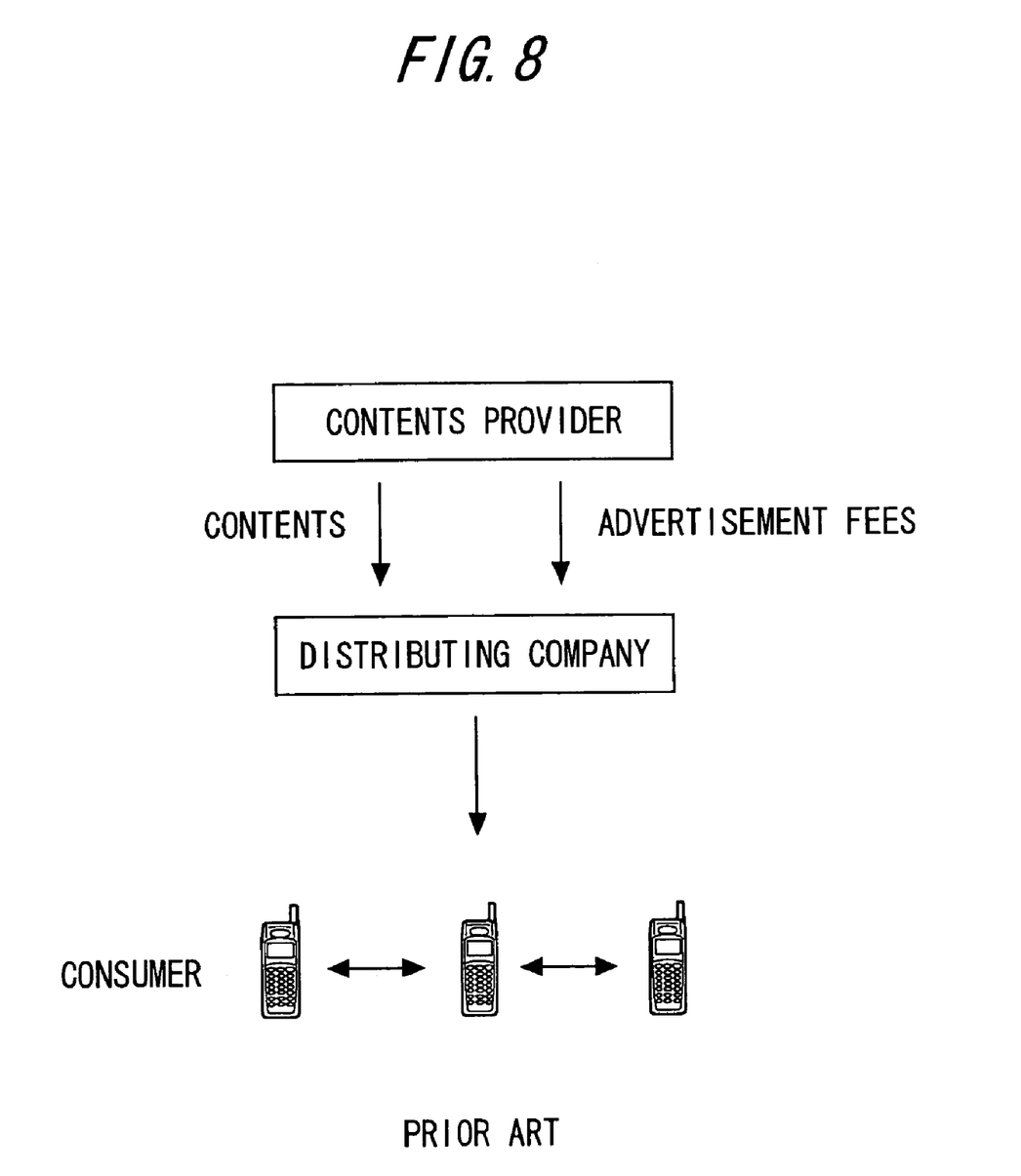
FIG. 8 is an explanatory diagram of a conventional distribution system.

Additionally, as shown in FIG. 8, because of a P2P (Peer to Peer: network type which needs no servers and through which clients directly communicate with each other), a system for realizing content distribution by communication between portable terminals is now a focus of attention.

For example, a communication system for emitting electric waves to detect a terminal located nearby, and relaying data by dynamically setting routes has been provided (Non-patent Document 1).

| | |
|---|---|
| [Patent Document 1] | JP 2002-163182 A |
| [Patent Document 2] | JP 2001-523025 A |
| [Patent Document 3] | JP 2000-83024 A |
| [Patent Document 4] | JP 2002-259584 |

[Non-Patent Document 1] Reported by okada, Apr. 12, 2002, Impress Corporation, "INTERNET Watch" Editorial Department, retrieved from the Internet on Jan. 20, 2003 <http://www.watch. impress.co.jp/internet/www/article/2002/0412/p2pc3.htm>

SUMMARY OF THE INVENTION

When a content provider distributes advertisement content to portable telephones, i.e., performs MobileAdvertisement, connection fees are paid to a telephone company (telephone line provider) according to the amount of data or the number of users to whom the content are distributed. Thus, there is no problem in the case of content of a relatively small data amount such as a text or a still image. However, in the case of an advertisement of music or a moving image, a data amount is increased, necessitating payment for enormous distribution costs.

As countermeasures, distribution of content through the P2P without using a communication line offered by the telephone line provider is conceivable.

However, in this case, there is a problem of impossibility of controlling the distribution (controlling period/place/number of people for advertising) or collecting distribution results (number of distributions/audience rate/evaluation).

Additionally, in the case of propagation of content unintended by the content provider to the P2P network, no means is available to stop the propagation.

Furthermore, no means is available to eliminate consumer's anxiety, e.g., "SENDING-IN OF A GREAT VOLUME OF UNWANTED CONTENT SUCH AS NUISANCE MAIL IS ANNOYANCE".

It is therefore an object of the present invention to enable communication which reflects intention of the content provider side by performing communication based on control information in content when the communication is carried out between wireless terminals.

The present invention adopts the following configurations in order to attain the object. That is, the present invention provides a content distributing method between wireless terminals, the method executed by the wireless terminal, comprising steps of:

detecting a communicable wireless terminal;
receiving content;
receiving control information regarding the content; and
executing control according to the control information.

The content distributing method may further include a step of recording a viewing and listening result of the content, in which when the control information is recovery information of the content, in the step of executing the control according to the control information, the viewing and listening result is added to the recovery information and transmitted to the other wireless terminal or a predetermined recovery terminal.

Further, in the content distributing method, when the viewing and listening result is added to the recovery information, the recovery information may be transmitted to the other wireless terminal if the number of viewing and listening results is less than a predetermined number, and the recovery information may be transmitted to the predetermined recovery terminal if the number of viewing and listening results reach the predetermined number.

Further, in the content distributing method, when the recovery information is transmitted to the recovery terminal, incentive information may be received from the recovery terminal.

Further, in the content distributing method, when the control information is communicable conditions, in the step of executing the control according to the control information, if the communicable conditions are not satisfied during the reception, the content and/or identification information may be deleted.

Further, in the content distributing method, the communicable conditions may be a receiving place, a time set in the content, and the number of propagation times.

Further, the content distributing method may further include a step of receiving content selection information from a user, in which in the step of executing the control according to the control information, the content may be allowed to be used only when the content match the selection information.

Further, in the content distributing method, the selection information may be the number of content or a type of content.

Further, in the content distributing method, when the control information is deletion information indicating content to be deleted, in the step of executing the control according to the control information, the content indicated by the deletion information may be deleted, and the deletion information may be transmitted to the other wireless terminal.

Further, a wireless terminal according to the present invention includes:

a detection unit detecting a communicable wireless terminal;

a reception unit receiving content and control information regarding the content;

a control unit executing control according to the control information; and a transmission unit transmitting the content and the control information based on the control of the control unit.

Further, the wireless terminal may further include a storage unit a recording viewing and listening result of the content, in which when the control information is recovery information of the content, the control unit may add the viewing and listening result stored in the storage unit to the recovery information and transmit the viewing and listening result to the other wireless terminal or a predetermined recovery terminal.

Further, in the wireless terminal, when the viewing and listening result is added to the recovery information, the control unit may transmit the recovery information to the other wireless terminal if the number of viewing and listening results is less than a predetermined number, and transmit the recovery information to the predetermined recovery terminal if the number of viewing and listening results reach the predetermined number.

Further, in the wireless terminal, when the recovery information is transmitted to the recovery terminal, the reception unit may receive incentive information from the recovery terminal.

Further, in the wireless terminal, when the control information is communicable conditions, if the communicable conditions are not satisfied during the reception, the control unit may delete the content and/or identification information.

Further, in the wireless terminal, the communicable conditions may be a receiving place of the content, a time set in the content, and the number of propagation times.

Further, the wireless terminal may further include an input unit receiving content selection information from a user, in which the control unit may allow the content to be used only when the content match the selection information.

Further, in the wireless terminal, the selection information may be the number of content or a type of content.

Further, in the wireless terminal, when the control information is deletion information indicating content to be deleted, the control unit may delete the content indicated by the deletion information, and transmit the deletion information to the other wireless terminal.

A content distribution program according to the present invention is a content distribution program between wireless terminals, the program executed by the wireless terminal, comprising steps of:

detecting a communicable wireless terminal;
receiving content;
receiving control information regarding the content; and
executing control according to the control information.

Further, the content distribution program may further include a step of recording a viewing and listening result of the content, in which when the control information is recovery information of the content, in the step of executing the control according to the control information, the viewing and listening result may be added to the recovery information and transmitted to the other wireless terminal or a predetermined recovery terminal.

Further, in the content distribution program, when the viewing and listening result is added to the recovery information, the recovery information may be transmitted to the other wireless terminal if the number of viewing and listening results is less than a predetermined number, and the recovery information may be transmitted to the predetermined recovery terminal if the number of viewing and listening results reach the predetermined number.

Further, in the wireless terminal, the content distribution program when the recovery information is transmitted to the recovery terminal, incentive information may be received from the recovery terminal.

Further, in the content distribution program, when the control information is communicable conditions, in the step of executing the control according to the control information, if the communicable conditions are not satisfied during the reception, the content and/or identification information may be deleted.

Further, in the content distribution program, the communicable conditions may be a receiving place of the content, a time set in the content, and the number of propagation times.

Further, the content distribution program may further include a step of receiving content selection information from a user, in which in the step of executing the control according to the control information, the content may be allowed to be used only when the content match the selection information.

Further, in the content distribution program, the selection information may be the number of content or a type of content.

A content distribution system according to the present invention includes:

a plurality of wireless terminals; and a distribution terminal for distributing content and control information to a part of the wireless terminals, in which the wireless terminal includes a detection unit detecting a communicable wireless terminal, a reception unit receiving the content and the control information regarding the content, a control unit executing control according to the control information, and a transmission unit transmitting the content and the control information based on the control of the control unit.

Furthermore, the present invention may be a recording medium recording a content distribution program which causes the wireless terminal (computer) to perform the aforementioned content distribution steps. By causing the wireless terminal to read and execute the program in this recording medium, functions thereof can be provided.

<<Computer Readable Recording Medium>>

Here, the computer readable recording medium means a recording medium capable of storing information such as data or a program by an electrical, magnetic, optical, mechanical, or chemical operation, and reading the information from the computer. Among such recording media, removable media from computers include, e.g., a flexible disk, a magneto-optical disk, a CD-ROM, a CD-R/W, a DVD, a DAT, 8 mm tape, a memory card, and the like.

Additionally, as recording media fixed to computers, a hard disk, a ROM (read-only memory), and the like are available.

As described above, according to the present invention, it is possible to provide a content distributing method, a wireless terminal, a content distribution program, and a content distribution system which enable communication reflecting intention of the content provider side by performing communication based on control information in content when the communication is carried out between the wireless terminals.

DETAILED DESCRIPTION OF THE INVENTION

Hereinafter, an embodiment of the present invention will be described with reference to the accompanying drawings. Constitutions of the embodiment is only illustrative, and not limitative of the present invention.

<System Configuration>

Figure 1:
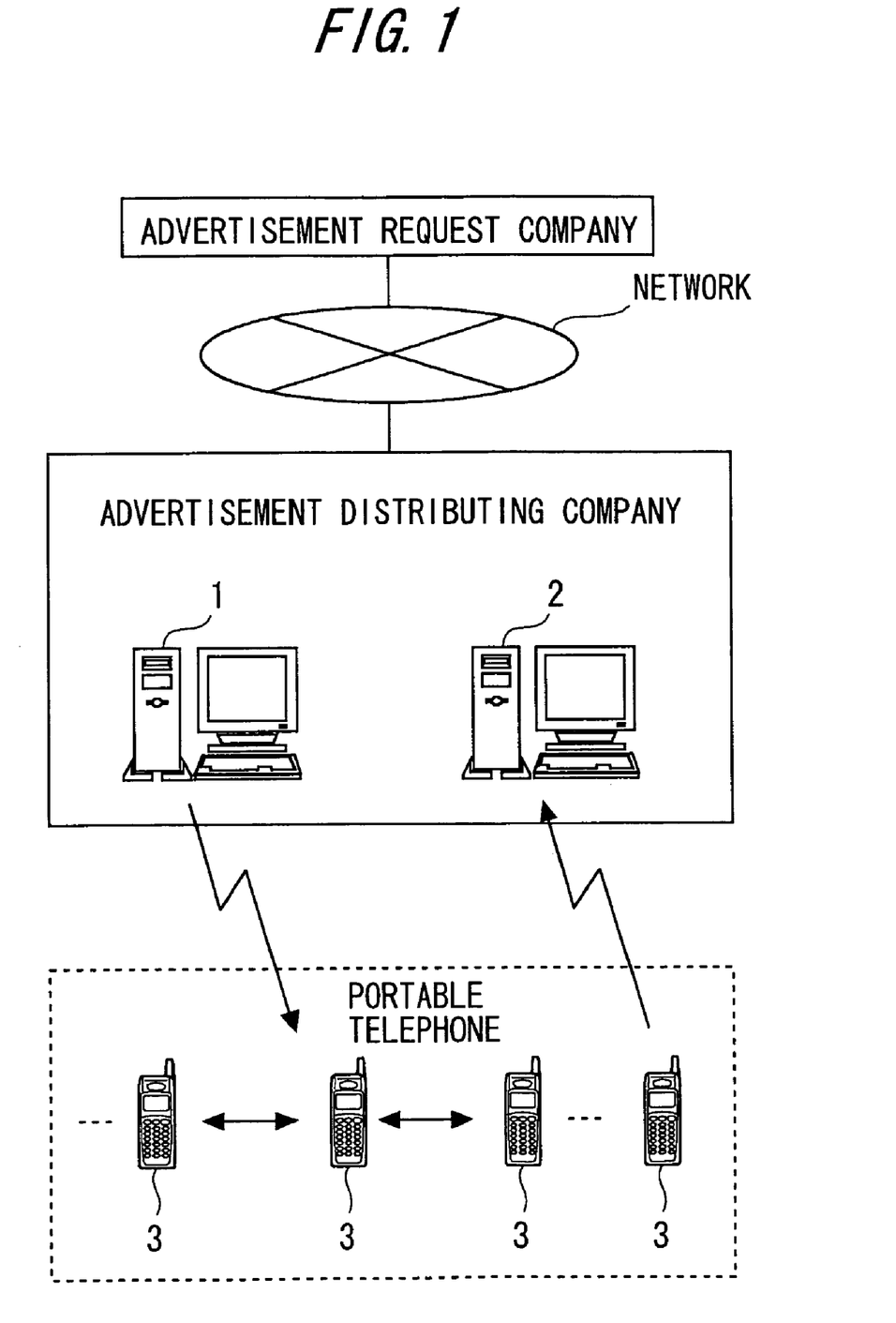
FIG. 1 is a system configuration diagram showing an embodiment of the present invention.

FIG. 1 is a system configuration diagram showing an embodiment of the present invention. The embodiment shown in the drawing includes an advertisement request company, a distribution terminal 1 and a recovery terminal 2 provided to an advertisement distributing company connected through a network such as Internet, and a wireless terminal 3 provided to a consumer to receive content.

The distribution terminal 1 and the recovery terminal 2 are general computers constituted of CPUs, memories, and the like. The distribution terminal 1 and the recovery terminal 2 can communicate with the wireless terminal 3 through a public line such as the Internet, or a short-haul radio communication such as Blue-tooth.

The wireless terminal 3 is an information processing terminal capable of performing communication with the distribution terminal 1 and the recovery terminal 2, and P2P communication with other wireless terminals, for example, a portable telephone, a PDA, a mobile computer, or the like.

Figure 2:
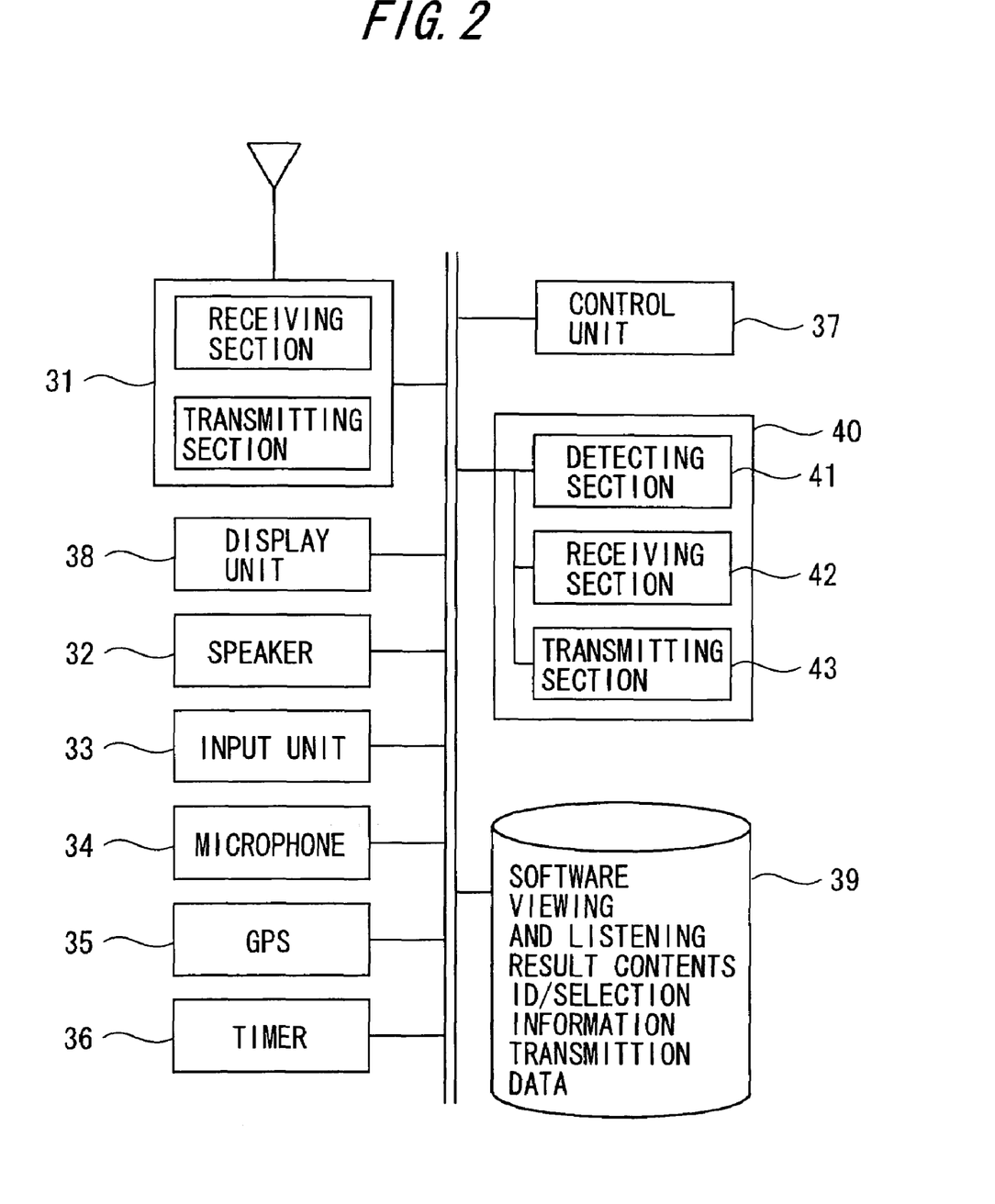
FIG. 2 is a block diagram of a portable telephone which is a wireless terminal of the embodiment.

FIG. 2 is a block diagram of a portable telephone which is the wireless terminal 3 of this embodiment. As shown in the drawing, the portable telephone 3 includes a communication unit 31, a speaker 32, an input unit 33, a microphone 34, a GPS 35, a timer 36, a control unit 37, a display unit 38, a storage unit 39, and a short-haul radio communication unit 40.

The communication unit 31 performs telephone calls or data communication through a radio telephone network. The speaker 32 outputs voices during calling, music during content reproduction, or the like. The input unit 33 has numeric keys for inputting telephone numbers, and selection keys for selecting various functions. The microphone 34 inputs voices during calling. The GPS 35 receives an electric wave from a satellite to obtain a current position. The timer 36 obtains a current date and time. The control unit 37 performs control for communication, or control according to control information.

The display unit 38 displays moving and still images as content. The storage unit 39 stores a telephone number, a mail address, a viewing and listening result, content, software (content distribution program), ID (intrinsic information such as machine number), selection information, and the like. The short-haul communication unit 40 performs P2P communication with the other wireless terminal 3 through the Bluetooth. The short-haul communication unit 40 has a detecting section 41, a receiving section 42, and a transmitting section 43. The detecting section 41 detects the wireless terminal 3 to which content of the system can be distributed from a communicable range. The receiving section 42 receives content from the other wireless terminal and control information regarding the content. The transmitting section 43 transmits the content and the control information under control of the control unit 37.

According to the embodiment, the content are a text, a still image, a moving image, music, a program, or the like. The portable telephone 3 receives the content and stores the content in the storage unit 39. The content stored in a user area of the storage unit 39 become targets to be selected by a user, and can be selected to be reproduced (used). In other words, when the user instructs reproduction from the input unit 33, the portable telephone 3 executes the content reproduction instructed by the control unit 37, and outputs music or a moving image from the speaker 32 or the display unit 38.

Additionally, the user inputs an identifier indicating a genre desired to be received or the number of content permitted to be received as selection information from the input unit 33, and stores the selection information in the storage unit 39.

Figure 3A:
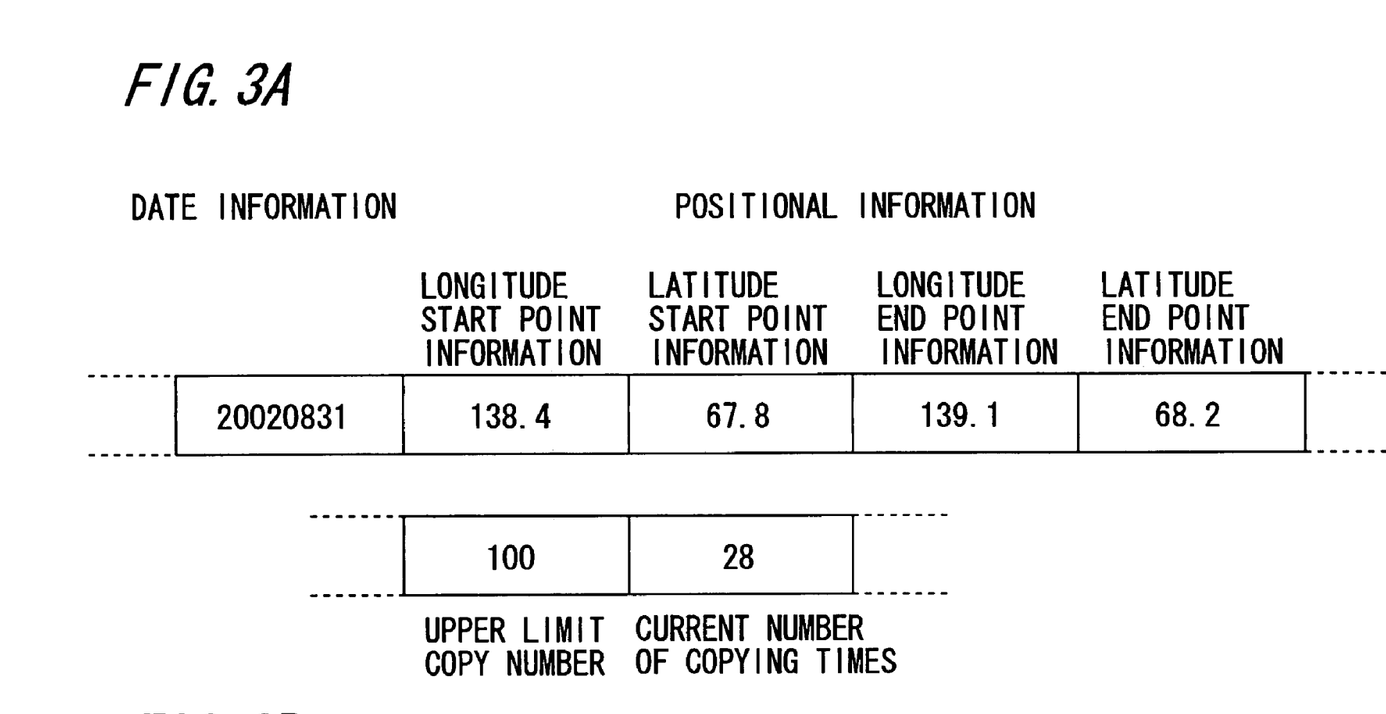
FIGS. 3A and 3B are explanatory diagrams of control information.
Figure 3B:
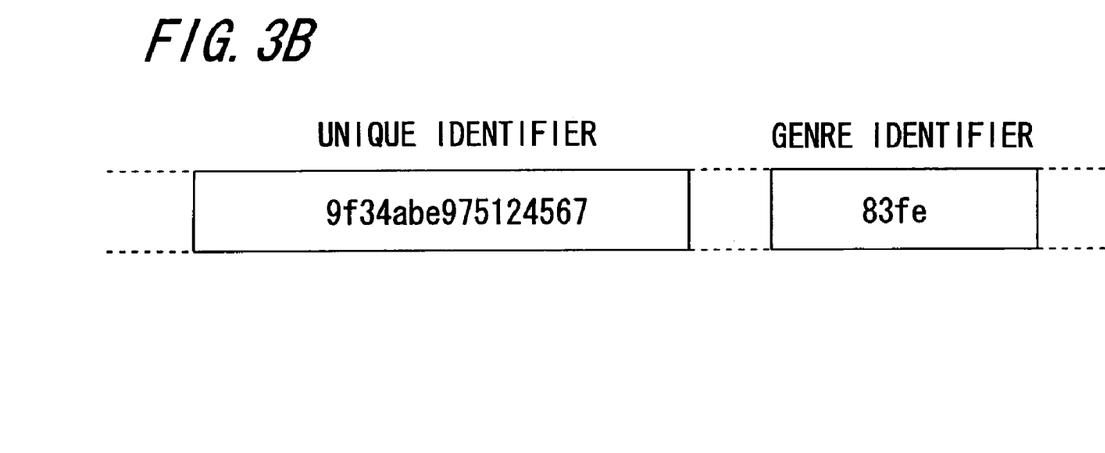

It should be understood that control information is added to the content as shown in FIGS. 3A and 3B.

As shown in FIG. 3A, the control information contains communicable conditions such as date information indicating a date which enables reception (or it may be date and time), position information indicating a receivable place, a upper limit copy number indicating the number of permitted distributing times, a current copy number (number of distributions), and the like. As shown in FIG. 3B, the control information further contains an identifier intrinsic to content, and a genre identifier indicating a type of content.

<Distributing Method>

Next, referring to FIGS. 4 to 7, the content distributing method of this embodiment will be described.

1. Preparation

First, the advertisement request company registers with the advertisement distributing company through the network, and subsequently registers data of content.

The advertisement distributing company distributes software for the services (content distribution program) to the consumer free of charge. The consumer (user) makes a contract to use the services, and installs the software in the portable telephone 3 as described above.

The advertisement distributing company records content and control information to be distributed in employee's or part-time worker's portable telephone 3 in which the software has been installed. Additionally, the advertisement distributing company registers the content and the control information in the distribution terminal 1 set up at a station or a hot spot through the Internet.

2. Distribution of Content

Figure 4:
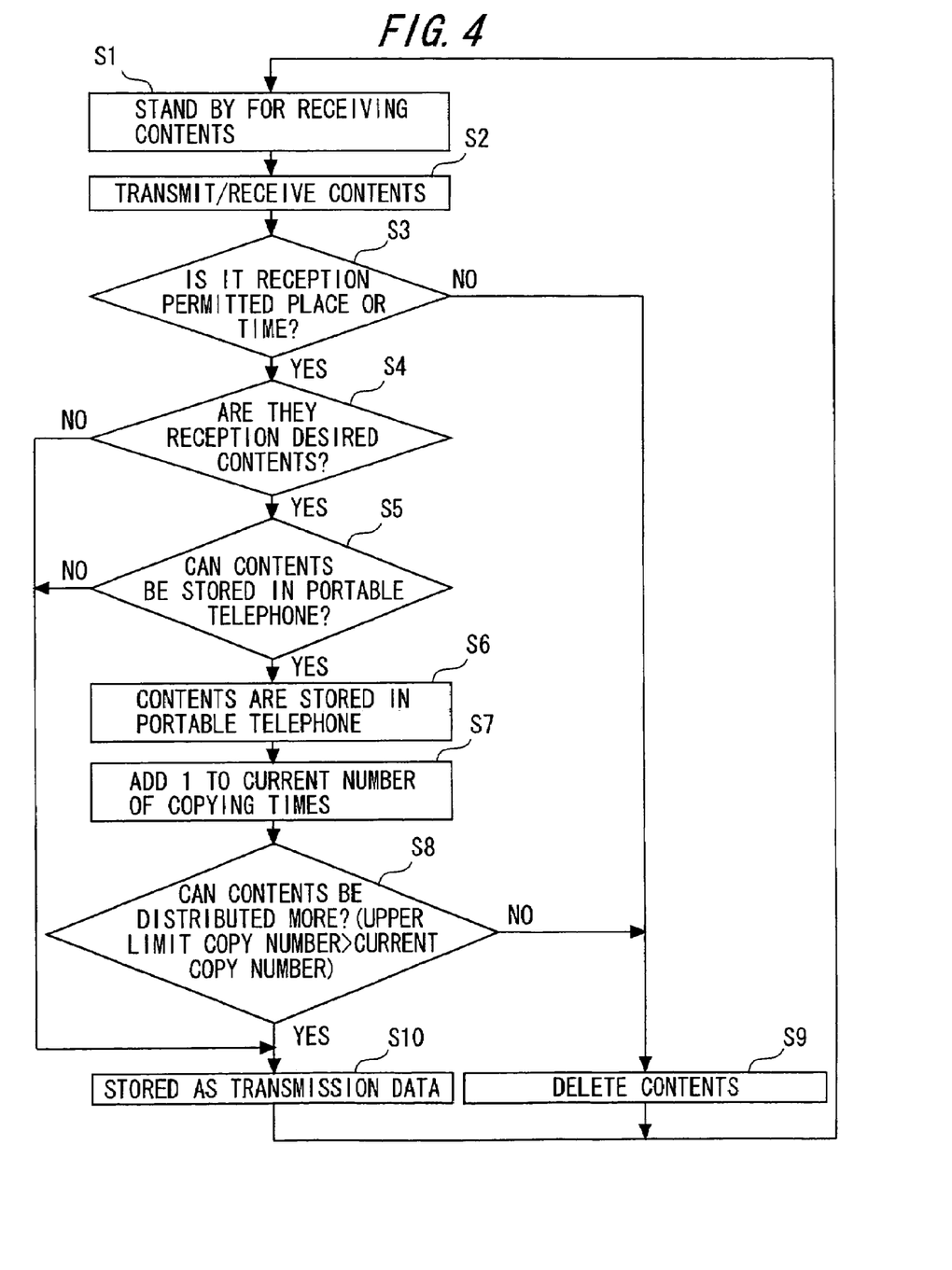
FIG. 4 is a flowchart for explaining a content distributing method according to the present invention.

When started, the portable telephone 3 reads and executes the software installed in the storage unit 39, and distributes the content as shown in FIG. 4.

First, the portable telephone 3 always monitors a communicable range by the detecting unit 41, and detects a communicable portable telephone 3 (step 1, abbreviated to S1 hereinafter).

Then, after the detection of the portable telephone 3 in which the same software has been installed, the portable telephone 3 performs transmission/reception of the content and the control information (S2). A sequence of the transmission/reception at this time is decided so that the content and the control information can be transmitted from a larger side to a smaller side by using ID's stored in the storage unit 39. The portable telephone 3 that has become a transmission side transmits the content and the control information for transmission stored in the storage unit 39 to the portable telephone 3 of a reception side as described later. After the end of transfer in one direction, if the two portable telephones 3 are still within a communicable distance, transfer in a reverse direction is subsequently tried. When a file size is about 1 M to 2 M bytes, if Bluetooth 2.0 of a next generation standard (maximum speed is 10 Mbps) is used, transfer can be carried out by 0.8 to 1.6 seconds. Accordingly, transfer can be expected not only at a hot spot such as a train/bus or a restaurant but also during passing-by on the street.

Next, the portable telephone 3 determines whether the received content satisfy the communicable conditions or not (S3). Specifically, date information shown in FIG. 3A is read from the control information, and compared with a current date obtained from the timer 36. If the current date does not pass over the date of the communicable conditions, the conditions are determined to be satisfied. If the current date passes over the date of the conditions, the content and identification information are deleted by determining that the conditions are not satisfied (S9).

Positional information shown in FIG. 3A is read from the control information, and compared with a current place obtained from the GPS 35. If the current place does not pass over the position (longitude is 138.4 to 139.1, and latitude is 67.8 to 68.2) of the communicable conditions, the conditions are determined to be satisfied. If the current place passes over the position of the conditions, the content and identification information are deleted by determining that the conditions are not satisfied (S9).

Next, the portable telephone 3 determines whether the content are suited to the selection information or not (S4). That is, the portable telephone 3 reads a genre identifier shown in FIG. 3B from the identification information of the content, and compares the genre identifier with the selection information stored in the storage unit 39. If the identifier does not mach the selection information, the content are not stored in the user area, in other words, not made usable. But the content and the identification information are stored as transmission data in the storage unit 39 (S10), and transmitted to the other portable telephone at the time of next transmission/reception (S2).

The portable telephone 3 determines whether or not the received content can be stored therein (S5). For example, the number of content stored in the user area of the storage unit 39 is compared with the number of content of the selection information. If the number of content stored in the user area reaches the number of content of the selection information, the content are not stored in the user area. But the content and the identification information are stored as transmission data in the storage unit 39 (S10), and transmitted to the other portable telephone at the time of next transmission/reception (S2). On the other hand, if the number of content stored in the user area does not reach the number of content of the selection information, the content are copied in the user area of the storage unit 39 (S6).

When the content is stored in the user area, the portable telephone 3 increments the current number of copying times of the control information (S7).

Then, the current number of copying times is compared with an upper limit copy number (S8). If the current number of copying times reaches the upper limit copy number, the content and the identification information are deleted (S9). If the current number of copying times is less than the upper limit copy number, the content and the identification information are stored as transmission data in the storage unit 39 (S10), and transmitted to the other portable telephone at the time of next transmission/reception (S2). Thus, when a set number of times is 100 as shown in FIG. 3B, distribution is performed by the advertisement distributing company until this set number of times is reached. At the time when the distribution is carried out by 100 times, the content are deleted, and accordingly propagated no more.

3. Deletion of Content

According to this embodiment, the content can be omitted, and only the control information can be propagated. For example, specific content can be deleted by propagating control information for deletion (deletion agent). It should be understood that an identifier indicating a deletion agent and the communicable conditions shown in FIG. 3A are recorded in the deletion agent.

Figure 5:
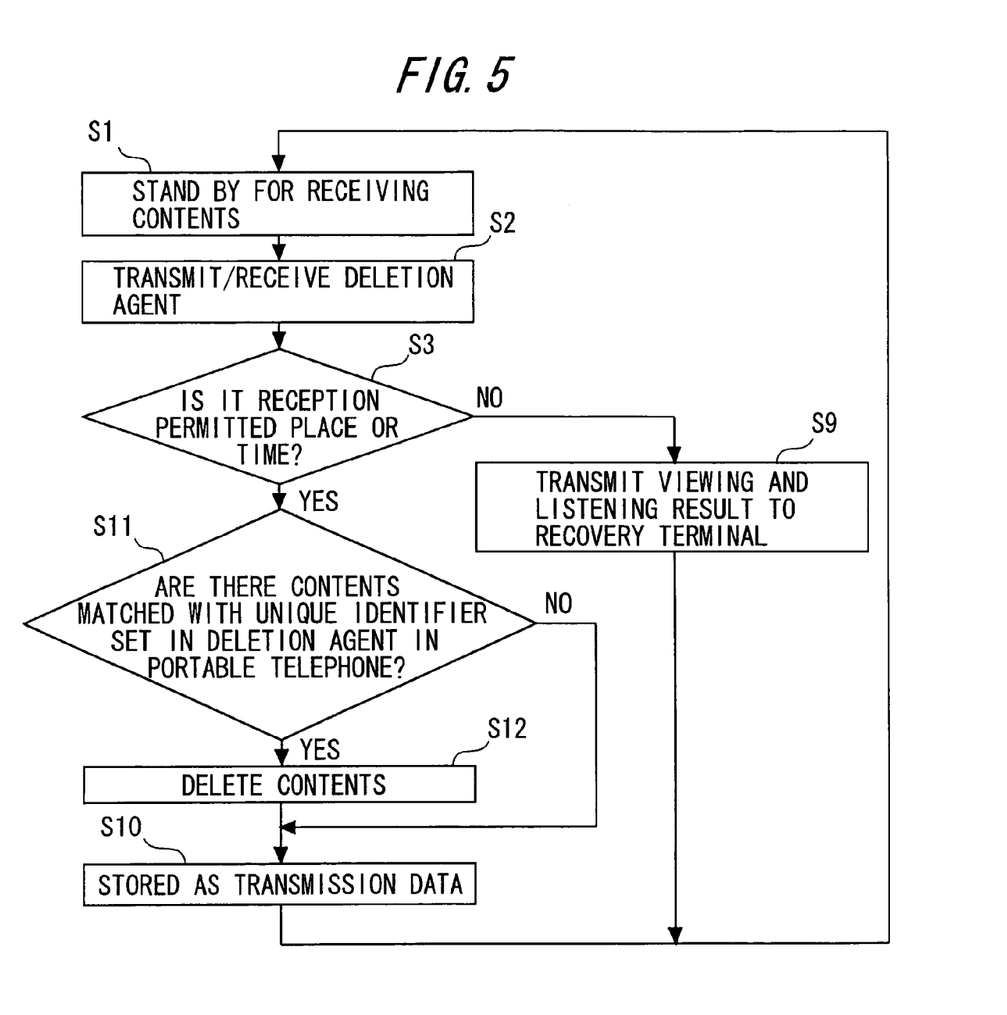
FIG. 5 is a flowchart for explaining a content deleting procedure.

As shown in FIG. 5, the portable telephone 3 performs the same content transmission/reception as that of FIG. 4 (S1 and S2) to determine communicable conditions (S3). If the communicable conditions are not satisfied, the control information (deletion agent) is deleted (S9). If the conditions are satisfied, control is performed based on the deletion agent. That is, the control unit 37 identifies the control information to be a deletion agent based on the identifier, and refers to an identifier of content of a deletion target contained in the deletion agent to retrieve matched content from the storage unit 39 (S11). Here, if there are no matched content, the control unit 37 stores the deletion agent as transmission data in the storage unit (S10), and transmits the data to the other portable telephone 3 at the time of next transmission/reception (S2). If there are matched content, the control unit 37 deletes the content (S12). Then, the control unit 37 stores the deletion agent as transmission data in the storage unit 39 (S10), and transmits the data to the other portable telephone 3 at the time of next transmission/reception (S2).

Thus, even if a third party other than the advertisement distributing company causes the system to propagate illegal content, it is possible to delete the illegal content by propagating control information for deletion (deletion agent).

4. Recovery of Viewing and Listening Result

According to this embodiment, it is possible to obtain a content viewing and listening situation by distributing control information for information recovery (recovery agent).

Figure 6:
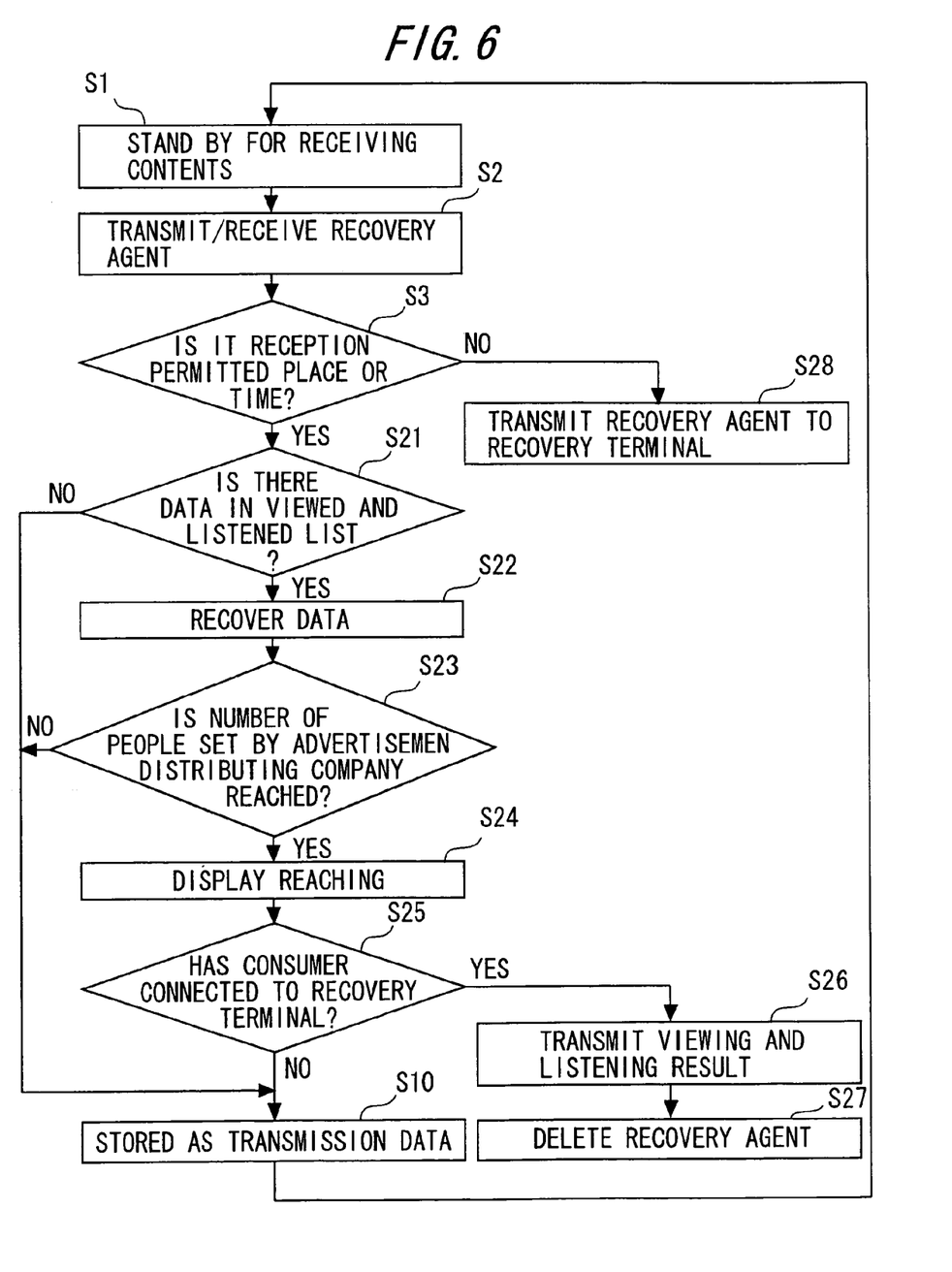
FIG. 6 is a flowchart for explaining a viewing and listening result recovering procedure.

The portable telephone 3 determines that the consumer has viewed and listened to content such as music or a moving image to its end when the content are reproduced to the end, and stores a unique identifier of the content as a viewing and listening result in the viewed and listened list of the storage unit 39. At this time, when the content are evaluated as the viewing and listening result, the evaluation may be recorded. For example, when the content are reproduced to the end, the portable telephone 3 displays "PLEASE EVALUATE THE CONTENT AT FIVE STAGES" on the display unit 38 to prompt inputting of evaluation. When the user inputs evaluation from the input unit 33, as shown in FIG. 6, a unique identifier of the content and the evaluation are correlated to be stored in a list form.

Figure 7:
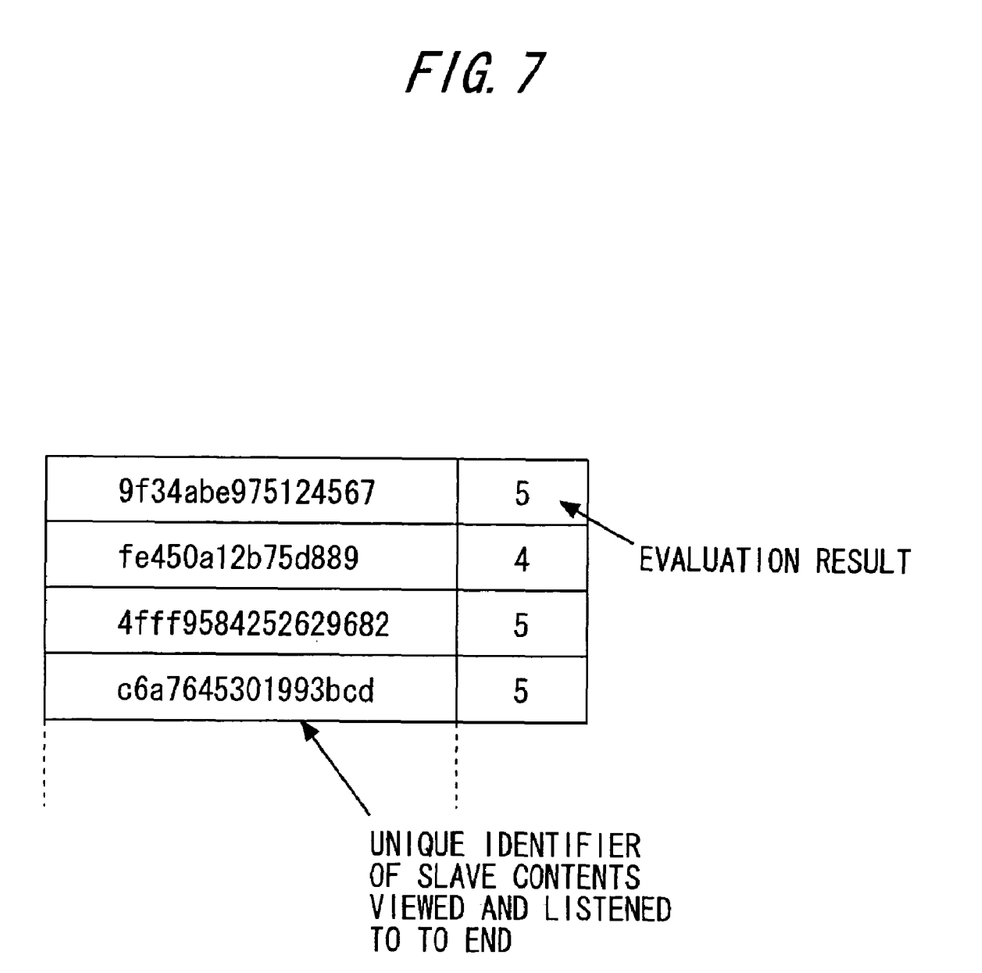
FIG. 7 is a diagram showing a viewed and listened list example according to the embodiment of the present invention.

Next, referring to FIG. 7, a procedure of recovering the viewing and listening result by a recovery agent will be described. It should be understood that an identifier indicating a recovery agent and the communicable conditions shown in FIG. 3A are recorded in the recovery agent.

The portable telephone 3 performs the same content transmission/reception as that of FIG. 4 (S1 and S2) to determine communicable conditions (S3). If the conditions are satisfied, control is carried out based on the recovery agent. That is, the control unit 37 determines a recovery agent based on the identifier, and determines whether or not there is a viewing and listening result in a viewed and listened list (S21). If there is no viewing and listening result, the control unit 37 stores the recovery agent as transmission data in the storage unit 39 without writing in the recovery agent (S10).

If the viewing and listening result is present, the control unit 37 writes the viewing and listening result in the recovery agent (S22).

Next, the control unit 37 determines whether or not viewing and listening results equivalent to the number of people set by the advertisement distributing company have been written in the recovery agent (S23). If the set number of people is not reached, the recovery agent is stored as transmission data in the storage unit 39.

If the set number of people is reached, the control unit 37 displays the reaching (win the election) of the set number on the display unit 38, and prompts the user to connect to the recovery terminal 2 (S24).

Accordingly, the user operates the portable telephone 3, and connects to the recovery terminal 2 through the radio telephone network. The control unit 37 determines whether or not connection has been made to the recovery terminal 2 (S25). If the connection has been made, the viewing and listening result is transmitted to the recovery terminal 2 (S26), and the recovery agent is deleted (S27). After the viewing and listening result is obtained, the recovery terminal 2 in turn transmits incentive information to the portable telephone 3, and the portable telephone 3 receives this information.

On the other hand, if no connection has been made to the recovery terminal 2 for a predetermined time or more, or the user inputs no connection in the step 25, the control unit 37 records the recovery agent as transmission data in the recording unit 39 without transmitting the viewing and listening result (S10). The recovery agent recorded as the transmission data is transmitted to the other portable telephone 3 at the time of next transmission/reception (S2) If the communicable conditions are not satisfied in the step 3, the recovery agent is transmitted to the recovery terminal (S28).

Thus, to recover the viewing and listening result, connection must be made to a specific terminal (recovery terminal 2). Accordingly, in place of payment for connection fees by the user, the incentive information is transmitted to the portable telephone 3 by using the radio telephone network. The incentive information only needs to be information valuable to the user, such as an image, or a moving image, music data, points exchangeable for goods, or electronic money.

As described above, according to the present invention, in the P2P type content distribution system, distribution results can be collected while cots are reduced, and conventionally unavailable functions necessary for advertisement are provided to enable effective advertising. The distribution of content can be controlled based on a place/time (period)/number of propagation times. Accordingly, this embodiment has an effect that advertising can be efficiently performed to a specified consumer. Furthermore, consumer's anxiety can be eliminated by limiting the number of received content and types thereof. Thus, when content unintended by the content distributing company are propagated to the P2P network, the content can be deleted by the deletion agent function.

What is claimed is:

1. A content distributing method between wireless terminals, the method executed by the wireless terminal, comprising:
    detecting a communicable wireless terminal;
    receiving content;
    receiving control information regarding the content;
    executing control according to the control information; and
    recording a viewing and listening result of the content,
    wherein when the control information comprises recovery information of the content, in the executing of the control according to the control information, the viewing and listening result of the content is added to the recovery information and transmitted to other wireless terminal or a predetermined recovery terminal.

2. The content distributing method according to claim 1, wherein when the viewing and listening result is added to the recovery information, the recovery information is transmitted to the other wireless terminal if the number of viewing and listening results is less than a predetermined number, and the recovery information is transmitted to the predetermined recovery terminal if the number of viewing and listening results reach the predetermined number.

3. The content distributing method according to claim 2, wherein when the recovery information is transmitted to the recovery terminal, incentive information is received from the recovery terminal.

4. The content distributing method according to claim 1, wherein when the control information comprises communicable conditions, in the step of executing the control according to the control information, if the communicable conditions are not satisfied during the reception, the content and/or identification information is deleted.

5. The content distributing method according to claim 4, wherein the communicable conditions comprise a receiving place, a time set in the content, and the number of propagation times.

6. The content distributing method according to claim 1, further comprising:
    receiving content selection information from a user,
    wherein in the executing of the control according to the control information, the content are allowed to be used only when the content match the selection information.

7. The content distributing method according to claim 6, wherein the selection information comprises the number of content or a type of content.

8. The content distributing method according to claim 1, wherein when the control information comprises deletion information indicating content to be deleted, in the executing of the control according to the control information, the content indicated by the deletion information are deleted, and the deletion information is transmitted to the other wireless terminal.

9. A wireless terminal comprising:
    a detection unit detecting a communicable wireless terminal;
    a reception unit receiving content and control information regarding the content;
    a control unit executing control according to the control information;
    a transmission unit transmitting the content and the control information based on the control of the control unit; and
    a storage unit recording a viewing and listening result of the content,
    wherein when the control information comprises recovery information of the content, the control unit adds the viewing and listening result stored in the storage unit to the recovery information and transmits the viewing and listening result to other wireless terminal or a predetermined recovery terminal.

10. The wireless terminal according to claim 9, wherein when the viewing and listening result is added to the recovery information, the control unit transmits the recovery information to the other wireless terminal if the number of viewing and listening results is less than a predetermined number, and transmits the recovery information to the predetermined recovery terminal if the number of viewing and listening results reach the predetermined number.

11. The wireless terminal according to claim 10, wherein when the recovery information is transmitted to the recovery terminal, the reception unit receives incentive information from the recovery terminal.

12. The wireless terminal according to claim 9, wherein when the control information comprises communicable conditions, if the communicable conditions are not satisfied during the reception, the control unit deletes the content and/or identification information.

13. The wireless terminal according to claim 12, wherein the communicable conditions comprise a receiving place of the content, a time set in the content, and the number of propagation times.

14. The wireless terminal according to claim 9, further comprising an input unit receiving content selection information from a user,
wherein, the control unit allows the content to be used only when the content match the selection information.

15. The wireless terminal according to claim 14, wherein the selection information comprises the number of content or a type of content.

16. The wireless terminal according to claim 9, wherein when the control information comprises deletion information indicating content to be deleted, the control unit deletes the content indicated by the deletion information, and transmits the deletion information to the other wireless terminal.

17. A storage medium stored with a content distribution program between wireless terminals, the program controlling the wireless terminal according to operations comprising:
detecting a communicable wireless terminal;
receiving content;
receiving control information regarding the content;
executing control according to the control information; and
recording a viewing and listening result of the content,
wherein when the control information comprises recovery information of the content, in the executing of the control according to the control information, the viewing and listening result of the content is added to the recovery information and transmitted to other wireless terminal or a predetermined recovery terminal.

18. A storage medium according to claim 17, wherein when the viewing and listening result is added to the recovery information, the recovery information is transmitted to the other wireless terminal if the number of viewing and listening results is less than a predetermined number, and the recovery information is transmitted to the predetermined recovery terminal if the number of viewing and listening results reach the predetermined number.

19. A storage medium according to claim 18, wherein when the recovery information is transmitted to the recovery terminal, incentive information is received from the recovery terminal.

20. A storage medium according to claim 17, wherein when the control information comprises communicable conditions, in the executing of the control according to the control information, if the communicable conditions are not satisfied during the reception, the content and/or identification information is deleted.

21. A storage medium according to claim 20, wherein the communicable conditions comprise a receiving place of the content, a time set in the content, and the number of propagation times.

22. A storage medium according to claim 17, further comprising receiving content selection information from a user,
wherein in the executing of the control according to the control information, the content are allowed to be used only when the content match the selection information.

23. A storage medium according to claim 22, wherein the selection information comprises the number of content or a type of content.

24. A content distribution system comprising:
a plurality of wireless terminals; and
a distribution terminal for distributing content and control information to a part of the wireless terminals,
wherein the wireless terminal includes a detection unit detecting a communicable wireless terminal, a reception unit receiving the content and the control information regarding the content, a control unit executing control according to the control information, a transmission unit transmitting the content and the control information based on the control of the control unit, and a storage unit recording a viewing and listening result of the content, wherein when the control information comprises recovery information of the content, the control unit adds the viewing and listening result stored in the storage unit to the recovery information and transmits the viewing and listening result to other wireless terminal or a predetermined recovery terminal.

* * * * *